US008070577B2

(12) United States Patent
Walker et al.

(10) Patent No.: US 8,070,577 B2
(45) Date of Patent: Dec. 6, 2011

(54) GAMING METHOD AND APPARATUS FOR EMPLOYING NEGATIVE OUTCOMES

(75) Inventors: Jay S. Walker, Ridgefield, CT (US); James A. Jorasch, Stamford, CT (US); Geoffrey M. Gelman, Stamford, CT (US); Stephen C. Tulley, Fairfield, CT (US); David F. Zucker, Winnetka, IL (US); Andrew D. Rogers, Los Altos, CA (US)

(73) Assignee: IGT, Reno, NV (US)

( * ) Notice: Subject to any disclaimer, the term of this patent is extended or adjusted under 35 U.S.C. 154(b) by 1891 days.

(21) Appl. No.: 10/420,981

(22) Filed: Apr. 22, 2003

(65) Prior Publication Data

US 2004/0014522 A1 Jan. 22, 2004

(51) Int. Cl.
*A63F 9/24* (2006.01)
*A63F 13/00* (2006.01)
*G06F 17/00* (2006.01)
*G06F 19/00* (2011.01)

(52) U.S. Cl. ................ 463/16; 463/17; 463/18; 463/19; 463/20; 463/22; 463/25

(58) Field of Classification Search ............... 463/16–25
See application file for complete search history.

(56) References Cited

U.S. PATENT DOCUMENTS 5,092,598 A 3/1992 Kamille ........................ 273/139
5,123,649 A 6/1992 Tiberio ..................... 273/143 R
5,570,885 A 11/1996 Ornstein ......................... 463/27
5,584,763 A * 12/1996 Kelly et al. ..................... 463/16
5,830,067 A 11/1998 Graves et al. ................... 463/40
5,947,820 A * 9/1999 Morro et al. ....................... 463/9
5,984,781 A * 11/1999 Sunaga ........................... 463/20
5,997,401 A 12/1999 Crawford ........................ 463/20
6,033,307 A 3/2000 Vancura .......................... 463/20
6,179,711 B1 1/2001 Yoseloff
6,244,958 B1 * 6/2001 Acres ............................. 463/26
6,270,409 B1 * 8/2001 Shuster ........................... 463/20
6,309,300 B1 10/2001 Glavich .......................... 463/26
6,328,649 B1 * 12/2001 Randall et al. .................. 463/20
6,358,149 B1 * 3/2002 Schneider et al. ............. 463/27
6,375,187 B1 4/2002 Baerlocher
6,409,172 B1 6/2002 Vancura ........................ 273/256
6,413,160 B1 * 7/2002 Vancura .......................... 463/16
6,425,824 B1 * 7/2002 Baerlocher et al. ............. 463/16
6,454,651 B1 9/2002 Yoseloff
6,471,208 B2 10/2002 Yoseloff et al.
6,488,580 B1 * 12/2002 Robb ............................. 463/23
6,494,785 B1 12/2002 Gerrard et al.
6,506,118 B1 1/2003 Baerlocher et al. ............. 463/25
6,514,141 B1 2/2003 Kaminkow et al.

(Continued)

OTHER PUBLICATIONS

Press Your Luck http://gscentral.net/cpyl.htm.*

(Continued)

*Primary Examiner* — Melba Bumgarner
*Assistant Examiner* — Jason Pinheiro
(74) *Attorney, Agent, or Firm* — K&L Gates LLP

(57) ABSTRACT

Systems and methods are provided for providing a negative outcome at a gaming device. The system determines that a player of a gaming device has equity which may be debited. An outcome of the gaming device is determined, and it is also determined that the outcome is a negative outcome. The balance (e.g., of the gaming device or another gaming device) is reduced by more than the wager amount.

26 Claims, 9 Drawing Sheets

U.S. PATENT DOCUMENTS

| | | | | |
|---|---|---|---|---|
| 6,569,015 | B1 | 5/2003 | Baerlocher et al. | |
| 6,599,192 | B1 | 7/2003 | Baerlocher et al. | |
| 6,632,140 | B2 | 10/2003 | Berman et al. | 463/18 |
| 6,632,141 | B2 | 10/2003 | Webb et al. | |
| 6,648,754 | B2 | 11/2003 | Baerlocher et al. | |
| 6,719,632 | B2 | 4/2004 | Palmer et al. | |
| 6,802,778 | B1 * | 10/2004 | Lemay et al. | 463/42 |
| 6,811,483 | B1 | 11/2004 | Webb et al. | |
| 6,890,257 | B2 | 5/2005 | Baerlocher | |
| 6,942,566 | B2 | 9/2005 | Baerlocher et al. | |
| 6,942,567 | B2 | 9/2005 | Baerlocher et al. | |
| 6,969,320 | B2 * | 11/2005 | Lind et al. | 463/25 |
| 7,001,273 | B2 | 2/2006 | Baerlocher | |
| 7,192,349 | B2 | 3/2007 | Baerlocher et al. | |
| 7,264,545 | B2 | 9/2007 | Maya et al. | |
| 7,364,507 | B2 | 4/2008 | Baerlocher et al. | |
| 7,601,057 | B2 | 10/2009 | Kaminkow | |
| 2001/0031664 | A1 * | 10/2001 | Acres | 463/42 |
| 2001/0054794 | A1 * | 12/2001 | Cole et al. | 273/138.1 |
| 2002/0103020 | A1 * | 8/2002 | Baerlocher et al. | 463/20 |
| 2003/0027629 | A1 * | 2/2003 | Pimienta | 463/25 |
| 2003/0036430 | A1 * | 2/2003 | Cannon | 463/42 |
| 2003/0040359 | A1 * | 2/2003 | Bryant | 463/25 |
| 2003/0045348 | A1 * | 3/2003 | Palmer et al. | 463/25 |
| 2003/0060274 | A1 * | 3/2003 | Webb | 463/25 |
| 2003/0064795 | A1 * | 4/2003 | Baerlocher et al. | 463/25 |
| 2003/0073480 | A1 * | 4/2003 | Thomas et al. | 463/18 |
| 2003/0078093 | A1 | 4/2003 | Simms et al. | |
| 2003/0092483 | A1 * | 5/2003 | Bennett et al. | 463/25 |
| 2003/0104861 | A1 * | 6/2003 | Gaidarev et al. | 463/25 |
| 2003/0109302 | A1 * | 6/2003 | Rist | 463/25 |
| 2003/0162584 | A1 | 8/2003 | Hughs-Baird et al. | |
| 2003/0162585 | A1 * | 8/2003 | Bigelow et al. | 463/20 |
| 2003/0162589 | A1 * | 8/2003 | Nguyen et al. | 463/25 |
| 2003/0176215 | A1 * | 9/2003 | Palmer et al. | 463/25 |
| 2004/0077422 | A1 * | 4/2004 | Bryant et al. | 472/137 |

OTHER PUBLICATIONS

Brochure: "Power Play Slots", (http //www softsite com/ulti/), Jan. 1997.

Poole, David, "Letter from Charlotte: Vegas perfect for racing", Las Vegas Review-Journal, Jun. 22, 1997, Section: C, p. 2C.

Cook, Melissa, "The Best New Slots", Casino Player Magazine, Apr. 1998, p. 45.

Website: "Casino Journal World of Slots AC Coin—The Interactive Experience", (http //www casinocenter com/journal/oct97/html/ac_ coin html), download date: Jun. 4, 1998.

"Station Announces Formation of GameCast Live, LLC and Release of Remote Play eSlots for In-Room Gaming Applications", PR Newswire, Jun. 6, 2001, Section: Financial News.

"A.C. Coin & Slot Staying Power", Global Gaming Business, Sep. 15, 2002, p. 42.

* cited by examiner

400

| | PLAYER IDENTIFIER 420 | NAME 430 | ADDRESS 440 | FINANCIAL ACCOUNT IDENTIFIER 450 | DEMOGRAPHIC 460 | CREDITS 470 | LIFETIME COIN-IN 480 |
|---|---|---|---|---|---|---|---|
| 405 | P111123 | SAM BROWN | ANYPLACE, USA | 1111-1111-1111-1111 | MALE, AGE 23 | 68 CREDITS, $0.25 PER CREDIT | $600 |
| 410 | P222234 | LINDA JONES | SOMEPLACE, USA | 2222-2222-2222-2222 | FEMALE, AGE 47 | 0 | $14400 |

FIG. 4

500

| | GAMING DEVICE IDENTIFIER 520 | NAME 530 | MANUFACTURER 540 |
|---|---|---|---|
| 505 | G333333 | DIAMOND MINE | ABC CORP. |
| 510 | G444444 | CRAZY DEUCES | XYZ CORP. |

FIG. 5

700

| SPIN NUMBER 720 | OUTCOME 730 | STARTING BALANCE 740 | PAYOUT / LOSS 750 | ENDING BALANCE 760 | SPINS REMAINING 770 |
|---|---|---|---|---|---|
| S 0001 | PLUM / CHERRY / BELL | 20 | 0 | 20 | 19 |
| S 0002 | PLUM / 7 / BAR | 20 | 0 | 20 | 18 |
| S 0003 | BAR / ORANGE / BELL | 20 | 0 | 20 | 17 |
| S 0004 | CHERRY / CHERRY / BELL | 20 | 5 | 25 | 16 |
| S 0005 | PLUM / CHERRY / CHERRY | 25 | 5 | 30 | 15 |
| S 0006 | PLUM / PLUM / PLUM | 30 | 20 | 50 | 14 |
| S 0007 | PLUM / 7 / 7 | 50 | 0 | 50 | 13 |
| S 0008 | BAR / BAR / BAR | 50 | 50 | 100 | 12 |
| S 0009 | ORANGE / BELL / BAR | 100 | -50 | 50 | 11 |
| S 0010 | PLUM / PLUM / PLUM | 50 | 20 | 70 | 10 |
| S 0011 | BAR / ORANGE / PLUM | 70 | 0 | 70 | 9 |
| S 0012 | 7 / PLUM / PLUM | 70 | 0 | 70 | 8 |

710

FIG. 7

800

810

| SPIN NUMBER 820 | OUTCOME 830 | STARTING BALANCE 840 | PAYOUT / LOSS 850 | ENDING BALANCE 860 | SPINS REMAINING 870 |
|---|---|---|---|---|---|
| S 0013 | PLUM / PLUM / BAR | 70 | 14 | 94 | 7 |
| S 0014 | PLUM / 7 / BAR | 94 | 0 | 94 | 6 |
| S 0015 | ORANGE / BELL / BAR | 94 | -47 | 47 | 5 |
| S 0016 | CHERRY / CHERRY / BELL | 47 | 5 | 52 | 4 |
| S 0017 | PLUM / CHERRY / BELL | 52 | 0 | 52 | 3 |
| S 0018 | PLUM / PLUM / PLUM | 52 | 20 | 72 | 2 |
| S 0019 | PLUM / 7 / 7 | 72 | 0 | 72 | 1 |
| S 0020 | ORANGE / BELL / BAR | 72 | -36 | 36 | 0 |

FIG. 8

GAMING METHOD AND APPARATUS FOR EMPLOYING NEGATIVE OUTCOMES

This application claims the benefit of priority of U.S. Provisional Patent Application Ser. No. 60/374,625, filed Apr. 22, 2002, entitled "GAMING DEVICE METHODS AND APPARATUS EMPLOYING ALTERNATE PAYOUT FEATURES", the entirety of which is incorporated by reference herein for all purposes.

BACKGROUND

Gaming devices are very popular in the U.S. and abroad. Gaming devices, such as slot machines, video poker machines, video blackjack machines, video roulette machines, video kenos, and video bingo machines, provide many casinos and other entities with the majority of their profits.

Players naturally find winning outcomes at gaming devices more appealing because winning outcomes add excitement to a gaming session. Although winning outcomes provide excitement to players, casinos must balance those benefits with the costs in paying players for winning outcomes. Accordingly, casinos have been forced to limit the average frequency of winning outcomes at a gaming device.

BRIEF DESCRIPTION OF THE DRAWINGS

FIG. 4 is a table illustrating an exemplary data structure of a player database for use in the present invention.

FIG. 5 is a table illustrating an exemplary data structure of a gaming device database for use in the present invention.

FIGS. 7 and 8 depict a table that illustrates an exemplary data structure of a session database for use in the present invention.

DETAILED DESCRIPTION OF THE INVENTION

Applicants have recognized that gaming sessions can be more exciting when a player can win greater average amounts, can win more frequently and/or can lose greater average amounts.

Some embodiments of the present invention allow a player to play at a gaming device with a greater frequency of winning outcomes and/or with a greater average payout when a player achieves a winning outcome.

Some embodiments permit a greater average frequency of winning outcomes without the corresponding need to increase the average payout per outcome of the gaming device.

In some embodiments of the present invention, a gaming device can provide for a negative outcome, in which the player loses more than just his wager amount. A "negative outcome" may reduce a credit balance of a gaming device. For example, a negative outcome may reduce the balance by, e.g. (1) more than the amount wagered on a handle pull, (2) more than the typical amount wagered, or (3) more than the maximum possible wager. Alternatively, a negative outcome may reduce other 'equity' of the player.

Figure 1:
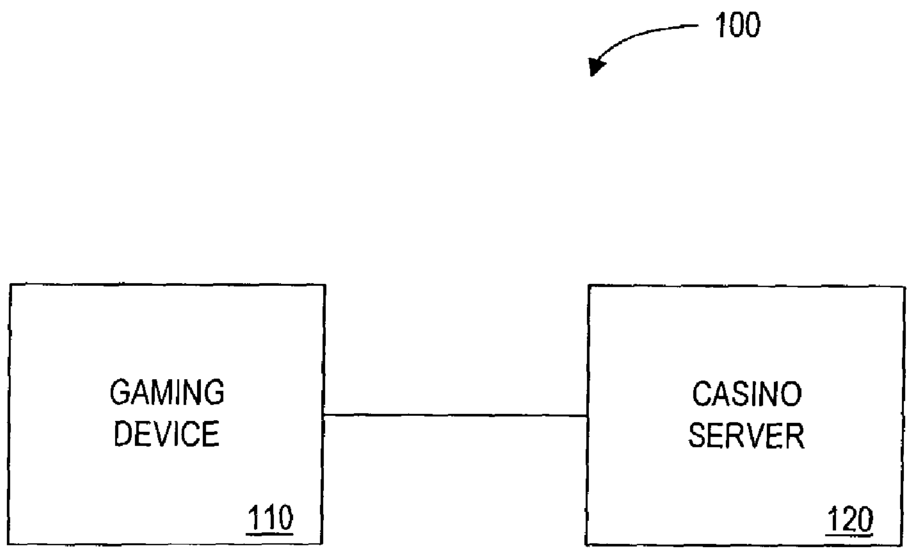
FIG. 1 is a block diagram of a system consistent with the present invention.

Referring now to FIG. 1, an apparatus 100 according to embodiments of the present invention includes a casino server 120 that is in communication with one or more gaming devices 110. Each of the gaming devices may comprise computers, such as those based on the Intel® Pentium® processor, that are adapted to communicate with the casino server 120; portable types of computers, such as a laptop computer; a palm-top computer; a hand-held computer; or a Personal Digital Assistant (PDA). Other equivalent devices capable of performing the methods specified herein would be apparent to one of skill in the art.

Any number of gaming devices may be in communication with the casino server 120. The number of each depicted in FIG. 1 is solely for purposes of illustration.

The casino server 120 may communicate with the gaming devices directly or via a network, including without limitation the Internet, a wireless network protocol, a local area network (or any combination thereof), through a Web site maintained by casino server 120 on a remote server or over an on-line data network including commercial on-line service providers, and bulletin board systems. The casino server may communicate with the gaming devices, the player devices and the insurer devices directly or indirectly. In yet other embodiments, the devices may communicate with casino server 120 over radio frequency (RF), cable TV, satellite links and the like.

Those skilled in the art will readily understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

The casino server 120 may function as a "Web server" that generates Web pages (documents on the Web that typically include an HTML file and associated graphics and script files) that may be accessed via the Web and allows communication with the casino server 120 in a manner known in the art.

In various embodiments, the casino server may perform any functions described herein as being performed by a gaming device, and vice versa.

FIG. 1 depicts only an embodiment of the invention. Other arrangements of devices to perform various methods specified herein will be readily appreciated by those of skill in the art.

Figure 2:
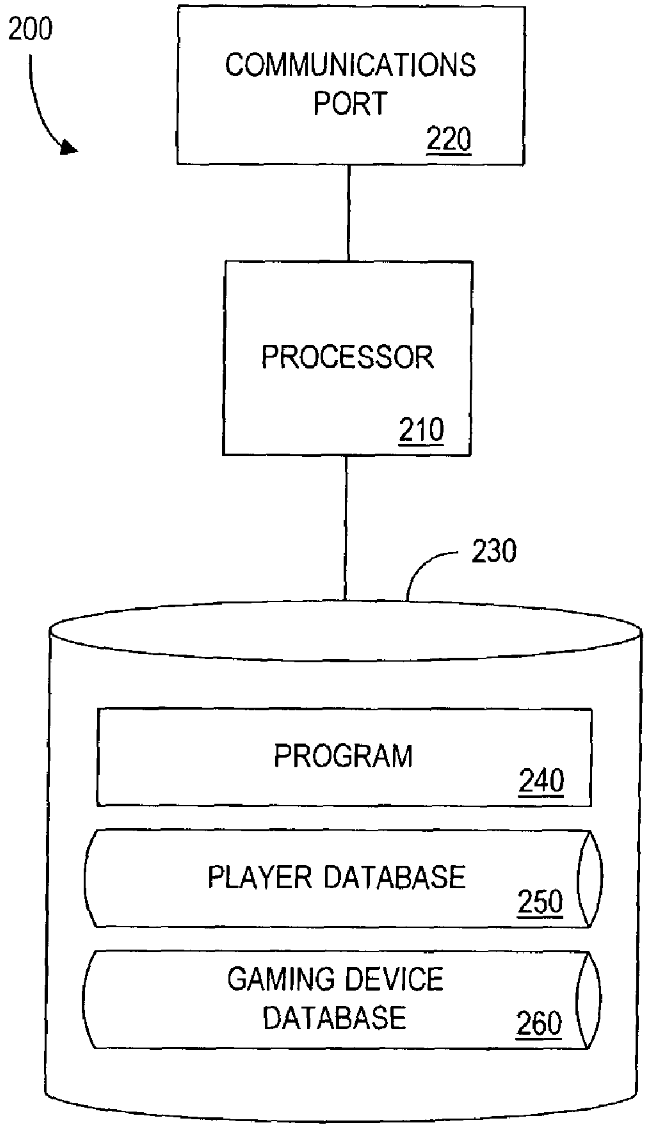
FIG. 2 is a block diagram of one embodiment of a casino server.

FIG. 2 illustrates an embodiment 200 of the casino server 120 (FIG. 1). The casino server 120 may be implemented as a system controller, a dedicated hardware circuit, an appropriately programmed general-purpose computer, or any other appropriate device including without limitation electronic, mechanical or electro-mechanical devices.

The server of the illustrated embodiment comprises a processor 210, such as one or more Intel® Pentium® microprocessors. The processor 210 is in communication with a communications port 220 and a data storage device 230. The communications port 220 allows the processor 210 to communicate with other devices, such as a gaming device. The data storage device 230 comprises magnetic memory, optical memory, semiconductor memory or any combination thereof. The data storage device 230 may include, for example, Random Access Memory (RAM), Read-Only Memory (ROM), a compact disc, digital video disc and/or a hard disk. The processor 210 and the storage device 230 may each be, for example: (i) located entirely within a single computer or computing device; or (ii) connected to each other by a remote communication medium, including without limitation a serial port cable, a telephone line, a network connection or a radio frequency transceiver. In some embodiments, the casino server 120 may comprise one or more computers that are connected to a remote server computer for maintaining databases.

The data storage device 230 stores a program 240 for controlling the processor 210. The processor 210 performs instructions of the program 240, and thereby operates in accordance with the present invention, and particularly in accordance with the methods described in detail herein. The program 240 may be stored in a compressed, uncompiled and/or encrypted format, as well as in a variety of other forms known in the art. The program 240 furthermore includes program elements that may be necessary, including without limitation an operating system, a database management system and "device drivers" for allowing the processor 210 to interface with peripheral devices. Appropriate program elements are well known to those skilled in the art, and need not be described in detail herein.

According to an embodiment of the present invention, the instructions of the program 240 may be read into a main memory from another computer-readable medium, such as into RAM from hard drive or ROM. Execution of sequences of the instructions in program 240 causes processor 210 to perform process steps described herein. In alternative embodiments, hard-wired circuitry may be used in place of, or in combination with, software instructions for implementation of the processes of the present invention, as would be understood by those of skill in the art. Thus, embodiments of the present invention are not limited to hardware, software or any specific combination of hardware and software.

The storage device 230 also stores a player database 250 and a gaming device database 260. The databases are described in detail below and depicted with exemplary entries in the accompanying figures. As will be understood by those skilled in the art, the schematic illustrations and accompanying descriptions of the databases presented herein are exemplary arrangements for stored representations of information. A number of other arrangements may be employed besides those suggested by the tables shown. Similarly, the illustrated entries of the databases represent exemplary information only; those skilled in the art will understand that the number and content of the entries can be different from those illustrated herein. Based on the present disclosure many other arrangements of data will be readily understood by those of skill in the art.

Figure 3:
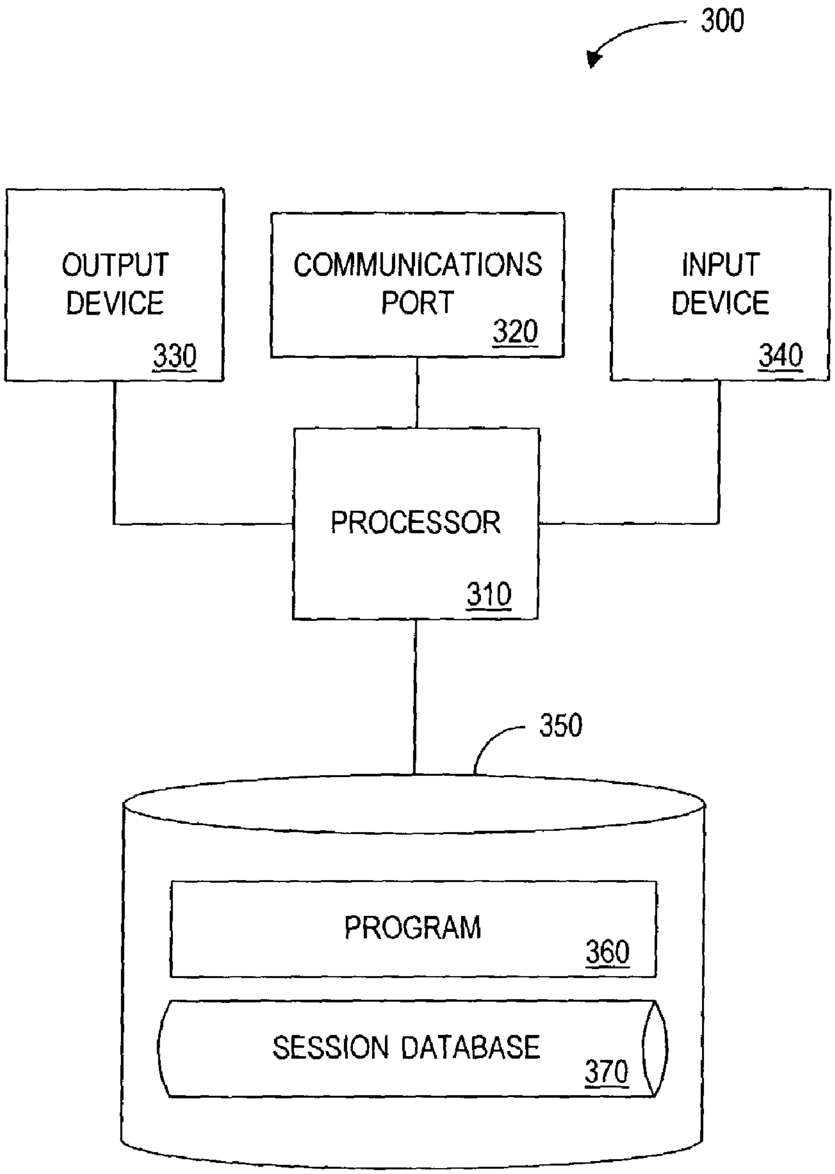
FIG. 3 is a block diagram of one embodiment of a gaming device.

FIG. 3 illustrates an embodiment 300 of a gaming device. Well-known examples of gaming devices include video poker, video blackjack, pachinko, mechanical slot machines and video slot machines. The gaming device may be implemented as a dedicated hardware circuit, an appropriately programmed general-purpose computer, or any other appropriate device including without limitation electronic, mechanical or electro-mechanical devices. Accordingly, the gaming device need not include the various components depicted in FIG. 3.

The gaming device of the illustrated embodiment comprises a processor 310, such as one or more Intel® Pentium® microprocessors. The processor 310 is in communication with a communications port 320 and a data storage device 350. The data storage device 350 comprises magnetic memory, optical memory, semiconductor memory or any combination thereof. The data storage device 350 may include, for example, Random Access Memory (RAM), Read-Only Memory (ROM), a compact disc and/or a hard disk. The processor 310 and the storage device 350 may each be, for example: (i) located entirely within a single computer or computing device; or (ii) connected to each other by a remote communication medium, including without limitation a serial port cable, a telephone line, a network connection or a radio frequency transceiver. In some embodiments, the gaming device may comprise one or more computers that are connected to a remote server computer for maintaining databases.

The data storage device 350 stores a program 360 for controlling the processor 310. The processor 310 performs instructions of the program 360, and thereby operates in accordance with the present invention, and particularly in accordance with the methods described in detail herein. The program 360 may be stored in a compressed, uncompiled and/or encrypted format, as well as in a variety of other forms known in the art. The program 360 furthermore includes program elements that may be necessary, including without limitation an operating system, a database management system and "device drivers" for allowing the processor 310 to interface with peripheral devices. Appropriate program elements are well known to those skilled in the art, and need not be described in detail herein.

According to an embodiment of the present invention, the instructions of the program 360 may be read into a main memory from another computer-readable medium, such as into RAM from hard drive or ROM. Execution of sequences of the instructions in program 360 causes processor 310 to perform process steps described herein. In alternative embodiments, hard-wired circuitry may be used in place of, or in combination with, software instructions for implementation of the processes of the present invention, as would be understood by those of skill in the art. Thus, embodiments of the present invention are not limited to hardware, software or any specific combination of hardware and software. The storage device 350 also stores a session database 370 which is described in detail below.

The processor 310 may also be in communication with one or more input devices 340 and one or more output devices 330.

Examples of input devices include: a button; a touch screen; a handle; a player tracking card device, which performs functions related to player tracking cards, such as reading player tracking cards and communicating information read from such cards to the processor 310 (Typically, information read from such cards includes unique player identifiers, such as a sequence of digits or a sequence of alphanumeric characters); a ticket reader, which is capable of reading tickets and particularly indicia registered on tickets and like material; a credit card reader which generally allow a card such as a credit card or debit card to be inserted therewithin and information to be read therefrom.

Examples of output devices include: a cash dispenser, which dispenses coins and/or bills to players that have requested to have funds be dispensed; a ticket printer, which may be commanded to print onto a substrate, such as paper or other material; a display screen, such as a liquid crystal display, a plasma display and a video display monitor.

Player Database

FIG. 4 is a tabular representation 400 of the player database. The tabular representation 400 of the player database includes a number of example records or entries 405 and 410 each defining a player. Those skilled in the art will understand that the player database may include any number of entries. The tabular representation 400 also defines fields for each of the entries or records. The fields specify: (i) a player identifier 420 that uniquely identifies the player; (ii) a name 430 of the player; (iii) an address 440 of the player; (iv) a financial account identifier 450 of the player, which may be, e.g., a credit card, debit card or checking account number; (v) demographic data 460 about the player, such as the age, gender, income level of the player; (vi) credits 470 which the player has accumulated in one or more previous and current plays at one or more gaming devices; and (vii) an indication of the aggregate amount 480 that the player has ever wagered, or that the player has ever deposited in a gaming device or made available for wagering at a gaming device.

Not all of the fields depicted in FIG. 4 are required, and various substitutions, deletions and other changes to the tabular representation will be readily apparent to those of ordinary skill in the art.

Gaming Device Database

FIG. 5 is a tabular representation 500 of the gaming device database. The tabular representation 500 of the gaming device database includes a number of example records or entries 505 and 510, each defining a gaming device. Those skilled in the art will understand that the gaming device database may include any number of entries. The tabular representation 500 also defines fields for each of the entries or records. The fields specify: (i) a gaming device identifier 520 that uniquely identifies the gaming device; (ii) a name 530 of the gaming device, which may additionally or alternatively specify the type of game(s) playable at the gaming device; and (iii) a manufacturer 540 of the gaming device.

Not all of the fields depicted in FIG. 5 are required, and various substitutions, deletions and other changes to the tabular representation will be readily apparent to those of ordinary skill in the art.

Figure 6:
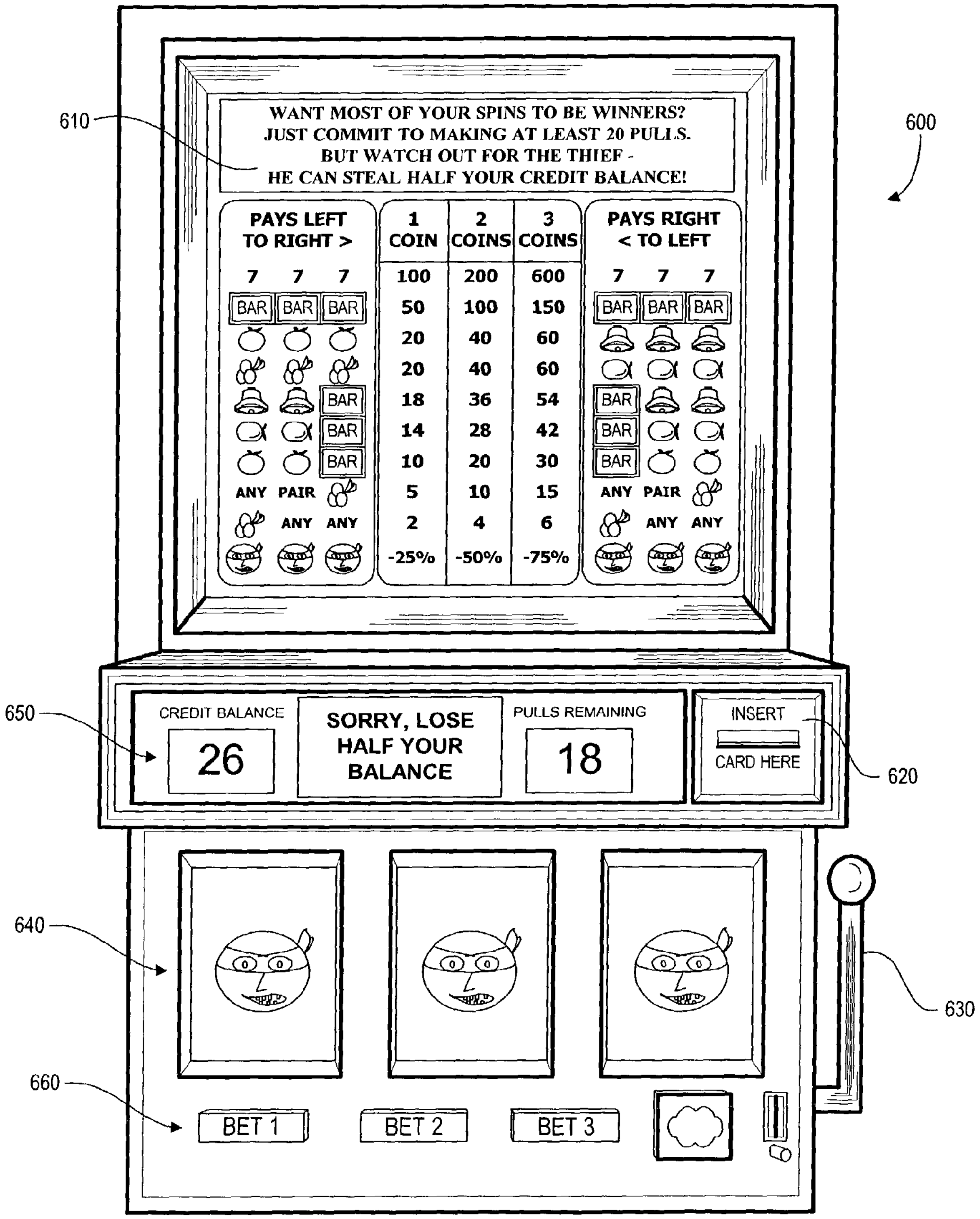
FIG. 6 is a front planar view of an illustrative gaming device, according to one embodiment.

Referring to FIG. 6, an illustrative gaming device 600 includes an information area 610, which displays a message to the user that a commitment of 20 outcomes makes most outcomes winning outcomes. Gaming device 600 also includes a card reader 620 for reading, e.g., player tracking cards. A handle 630 is used for initiating plays, in a manner known in the art. A display area 650 provides information, such as a credit balance and a number of spins (i.e. plays or outcomes) remaining (e.g., for play according to the terms of a contract as described herein).

Reels 640 display the outcome of a play in the form of a reel symbol on each reel, as is known in the art. Buttons 660 allow the player to indicate wager amounts for an outcome.

Session Database

FIGS. 7 and 8 depict tables 700 and 800 representing the session database. The tables 700 and 800 include a number of example records or entries (710 and 810, respectively), each defining an outcome of a player's gaming session. Those skilled in the art will understand that the session database may include any number of entries. The tables 700 and 800 also define fields for each of the entries or records. The fields specify: (i) a spin number (720 and 820) that uniquely identifies the outcome; (ii) an outcome (730 and 830) description, which describes the particular reel symbols; (iii) a starting balance (740 and 840) before any adjustment in the balance due to the outcome; (iv) a payout or loss (750 and 850) due to the outcome; (vi) an ending balance (760 and 860) after any adjustment in the balance due to the outcome, and which is the sum of the starting balance and the payout or loss due to the outcome; and (vii) a number of outcomes remaining (770 and 870) which must be completed per the terms of an agreement as described in further detail herein.

Not all of the fields depicted in FIGS. 7 and 8 are required, and various substitutions, deletions and other changes to the tabular representation will be readily apparent to those of ordinary skill in the art.

Process Description

In general, a method according to an embodiment of the present invention allows the gaming device to generate a negative outcome, in which the player loses more than just his wager amount. A "negative outcome" may reduce a credit balance of a gaming device, or other equity of the player. For example, a negative outcome may reduce the player's balance by, e.g. (1) more than the amount wagered on a handle pull, (2) more than the typical amount wagered, or (3) more than the maximum possible wager.

Figure 9:
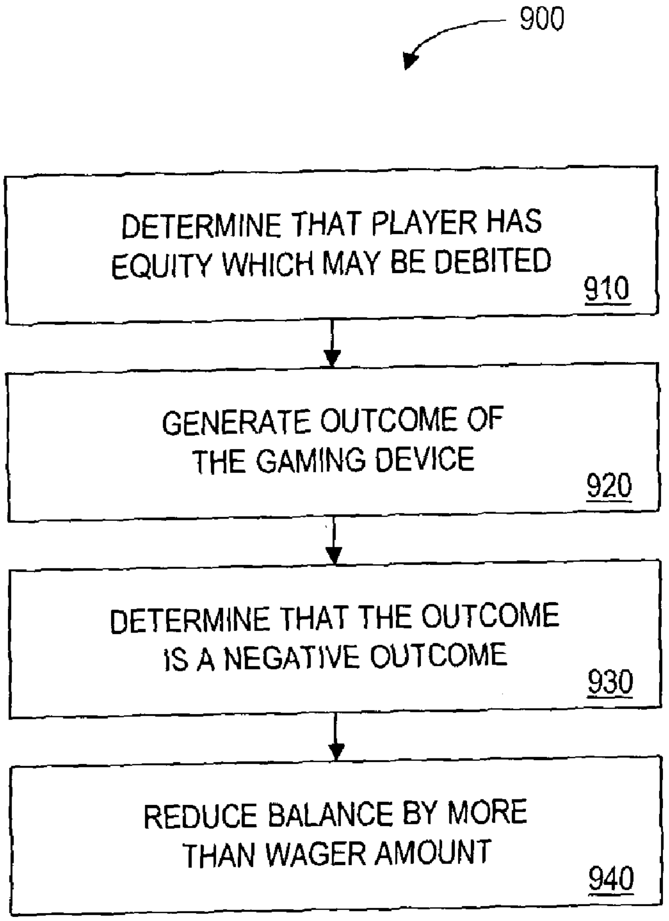
FIG. 9 is a flow chart illustrating an exemplary process according to an embodiment of the present invention.

Referring to FIG. 9, a flow chart 900 represents an embodiment of the present invention that may be performed by a gaming device and/or the casino server 120 (FIG. 1). The particular arrangement of elements in the flow chart of FIG. 9, as well as the other flow charts and processes described herein, is not meant to imply a fixed order to the steps; embodiments of the present invention can be practiced in any order that is practicable.

At step 910, it is determined that a player of the gaming device has equity which may be debited. As described in detail herein, such a determination generally may comprise a determination that (i) the gaming device or another gaming device has a balance sufficiently in excess of the wager amount; (ii) the player is due to receive some future benefit, such as a bonus amount or a prize; (iii) the player has an account (e.g., hotel bill, credit card account) which may be charged; (iv) the player may be made to agree to repay an amount owed; (v) the player may be estimated to be trustworthy enough to repay an amount owed; (vi) the player may be made to agree to perform a task (e.g., accept a marketing offer, answer survey questions) in order repay an amount owed.

At step 920, an outcome of the gaming device is generated in a manner known in the art. In one embodiment, the gaming device receives a signal from the player to initiate an outcome (e.g., the player pulls a handle or pushes a button), and the gaming device in response generates a pseudo-random number which is resolved to a series of reel symbols. The gaming device then causes the reels to stop or be displayed so that the specified reel symbols are displayed to the player.

At step 930, it is determined whether the outcome is a negative outcome. As is known in the art, conventional gaming devices typically include a payout table which defines a payout for each possible outcome of the gaming device. In embodiments of the present invention, one or more payout tables may be used to define a payout for each possible outcome of the gaming device, as described in detail herein.

At step 940, a balance (e.g., of the gaming device or another gaming device) is reduced by more than the wager amount. As is known in the art, in conventional gaming devices the balance is typically reduced by the wager amount immediately before an outcome is generated, and then the balance is increased (upon a winning outcome) immediately after the outcome is generated. Thus, the balance is adjusted at two points in time. In embodiments of the present invention, the balance may be reduced by more than the wager amount in one or more points in time.

For example, the balance may be reduced by the wager amount immediately before an outcome is generated, and then reduced again (upon a negative outcome) immediately after the outcome is generated. Alternatively, the balance might be reduced at one point in time (e.g., by twice the wager amount immediately after the outcome is generated).

In some embodiments, the gaming device only provides the player with his equity upon the request of the player. Nevertheless, the player may continue playing even if he has the capability of retrieving his equity.

Equity may take many forms in various embodiments of the present invention. A player who has equity which may be debited has value, such as an amount of funds, that may be retrieved from the player. Measures may be taken to assure that such amount will be retrievable from the player if the player must pay such an amount (e.g., upon a negative outcome).

In one embodiment, the player's 'equity' may be that the gaming device (or another gaming device) has a balance sufficiently in excess of the wager amount. As described in detail herein, the required balance may be: a predetermined number (e.g., at least 20 credits), or a predetermined multiple of a wager amount (e.g., at least twice the wager amount).

In one embodiment, the player's 'equity' may be an amount of money the player has won during play at the gaming device, but has not yet been paid to the player. This amount may also be indicated as part of a credit balance, or may be indicated as a separate "winnings balance."

In one embodiment, the player's 'equity' may be a number of credits with which the player has begun, or which the player has won during the course of a contracted period of play, but which the player cannot retrieve until the end of the contract period. For example, a player might enter into an agreement with the gaming device in which the player begins with one hundred credits, makes one hundred handle pulls, and then keeps the number of credits remaining after adding any winning amounts and deducting any wager amounts from the initial balance. In this agreement, the player's credit balance is a form of equity, even though the player has not necessarily paid one hundred credits for his initial balance, and cannot cash out the credit balance until after the one hundred handle pulls have been completed.

In one embodiment, the player's 'equity' may be that a balance of another gaming device or another player is sufficiently in excess of the wager amount. In one embodiment, a player enters the name of a friend into the player's gaming device, and the player's gaming device may transmit that name to the casino server. The casino server would then query other gaming devices in search of the friend's name. The friend's gaming device, which has read the friend's player tracking card, identifies the friend's name and communicates to the casino server that the friend is present. The casino server then directs the friend's gaming device to ask the friend whether he agrees to allow his credit balance to be used as equity by the player. If the friend agrees, then any negative outcomes achieved by the player may cause the player's friend to lose credits from his credit balance.

In another example, a player and one or more friends share a common credit balance. The cost of each person's handle pulls is deducted from the common credit balance, and the winnings of each person may be added back to the credit balance. Whenever the player or one of his friends receives a negative outcome, a corresponding amount of credits may be deducted from the commonly held credit balance. Of course, such an embodiment applies to relatives, acquaintances, spouses, etc. of the player, not just to friends.

In one embodiment, the player's 'equity' may be that the player has an account (e.g., hotel bill, credit card account) which may be charged. For example, the player may enter his credit card number into the gaming device using a keypad or other input device, or have his account number associated with his player tracking card account. The gaming device would then be authorized to charge the player's credit card, e.g., upon the occurrence of a negative outcome, or upon the occurrence of a negative outcome for which the balance was insufficient.

In one embodiment, the player's 'equity' may be that the player's hotel bill can be charged for negative outcomes. For example, when a player achieves a negative outcome, the amount of the negative outcome may be added to the player's hotel bill.

In one embodiment, the player's 'equity' may be that the player's comp points (points typically provided in exchange for wagers made at a casino) may be reduced. For example, negative outcomes may cause a player to lose comp points from an existing balance of comp points.

In one embodiment, the player's 'equity' may be that the player is due to receive some future benefit, such as a bonus amount or a prize. For example, the player may be guaranteed to receive a bonus amount (increase in balance) or bonus prize (e.g., free meal at a casino restaurant) in the future. Such a bonus amount may be conditioned upon some player activity, such as maintaining a minimum amount of play (e.g., outcomes generated per time, minimum duration of play) at the gaming device.

In one embodiment, the player's 'equity' may be that the player is due some consideration in exchange for an amount of money the player has paid, e.g., inserted into a gaming device. For example, the player may have inserted $20 into the gaming device in return for a $50 meal at the casino's restaurant, which the player has not yet received from the restaurant.

In one embodiment, the player's 'equity' may be that the player may be made to agree to repay an amount owed, or similarly may be estimated to be trustworthy enough to repay an amount owed. For example, the player may agree to pay for any 'negative balances' or other amounts owed as a consequence of negative outcomes. For example, the player may sign an electronic signature pad at the gaming device to signify his agreement to pay for any losses incurred as a consequence of negative outcomes. If the player does incur such losses, then his signature may constitute proof of his obligation to cover his losses.

In one embodiment, the player's 'equity' may be that the player may be made to agree to perform a task (e.g., accept a marketing offer, answer survey questions) in order repay an amount owed. For example, a player may conditionally agree to accept marketing offers and thus agree to do business with the offering merchant if a (sufficiently large) negative outcome occurs. In one such embodiment, a player agrees that if a negative outcome occurs (or one which cannot be paid for in another way such as with the player's balance), the player will switch his long-distance carrier to a particular merchant. Most merchants would pay the casino for the ability to acquire new customers, so the casino may receive payment from a merchant, rather than from the player, when the player attains a negative outcome.

As another example, the player may agree that if a negative outcome occurs (or one which cannot be paid for in another way such as with the player's balance), the player will answer survey questions for the casino or for third party merchants who are paying the casino.

In some embodiments, a player may be required to maintain a particular level or amount of equity. For example, if the player's equity in a gaming device ever goes below a predetermined threshold, then the player may be required to establish more equity in the gaming device. For example, as described herein a player's equity might include his credit balance. The gaming device may require that, if the player's credit balance falls below 10 credits, the player must insert more coins or otherwise increase his credit balance over 10 credits.

In some embodiments, a player who does not have sufficient equity in a gaming device may be allowed to play the gaming device in a mode that does not employ negative outcomes. For example, a different payout table may be used if, e.g., the credit balance falls below 10 credits. The payout table for the gaming device where negative outcomes are not employed may be substantially different from the pay table when negative outcomes are employed. Thus, a gaming device may employ two (or more) different payout tables, such as one employing at least one negative outcome, and one employing no negative outcomes.

The switch from one payout table to another may be made with player permission. For example, when a player who is playing a gaming device in "standard mode" (i.e. negative outcomes are not permitted) has sufficient equity, the gaming device may offer to allow the player to play in "negative outcome mode" (i.e. negative outcomes are permitted). If the player accepts, then the display on the gaming device describing payouts for standard mode (which had been backlit) may be darkened, while display on the gaming device describing payouts for negative outcome mode may become newly backlit.

For example, a player might begin a session by inserting only enough coins on every handle pull to pay for that handle pull. However, in order to play using negative outcomes, the player must have a credit balance of at least 20 credits. If the player wins a payout of 30 coins, that payout is added to the player's credit balance. The gaming device then offers to allow the player to play using negative outcomes. The offer may be made via text, audio, or any other mode of communication.

In some embodiments, when the player has sufficient equity, the gaming device may automatically switch to negative outcome mode from standard mode. Similarly, when a player who had been playing in negative outcome mode has insufficient equity, the gaming device may offer to allow him to play in standard mode. If the player does not accept, then the gaming device may require him to insert more credits.

In some embodiments, the gaming device may facilitate the building up of equity by withholding a portion of a player's payouts. For example, the gaming device may withhold: a certain number of credits for each winning outcome (e.g., one credit per winning outcome); a certain number of credits for each winning outcome resulting in a winning amount over a minimum (e.g., one credit when a win pays more than 5 credits); a predetermined percentage of winning amounts (e.g., 5% of any payout); the total of any second or subsequent winning amount (e.g., any payout that occurs immediately after a prior payout); the total of a winning amount that is not the largest payout in a sequence of consecutive winning amounts; the total of a winning amount from a pay line that is not the highest-paying pay line on a given outcome.

The total amount of such withholdings may be tracked by the gaming device, and may be displayed to the player as a separate balance. Similarly, a second (or additional) balance may be present and may be increased as conventional balances are increased (e.g., by inserting coins).

Such a separate balance may be labeled, for example, an "equity balance" to inform the player. Negative outcomes may then reduce the player's equity balance. At the end of a playing session, if the player still has a positive equity balance remaining, then the player may be able to cash out some or all of the equity balance and receive some or all of it as funds. The gaming device may also require the player to insert coins or to allow the deduction of credits on a regular basis so as to build up an equity balance. For example, the player may be required to insert an extra coin every three outcomes in order to build up an equity balance.

As described herein, a negative outcome may reduce the player's equity, such as a balance of the gaming device. For example, a negative outcome may reduce a balance by ten credits, or by 50%.

In one embodiment, negative outcomes cause a player to lose a fixed percentage (e.g., 50%) of his equity. A negative outcome might even take away more than 100% of equity. The player might then be responsible for any amount taken in excess of his credit balance. For example, if 150% of the player's credit balance is taken, then the player loses his credit balance and must additionally insert a number of credits equal to half of what his credit balance had been. Alternatively, the player might pay the amount in excess of the amount of his credit balance using other equity. If a negative outcome would take away a fractional credit, then the number of credits to be taken may be rounded either in favor of the casino or in favor of the player. For example, if a player has a balance of 11, and he receives a negative outcome that takes away 50%, then the player may end up with either 5 or 6 credits, depending on the rules of rounding that are applied.

In one embodiment, fractional amounts of credits that were not taken from the player may be tracked, and when the accumulated fractional amounts add up to one or more full credits, full credits are deducted accordingly.

The amount a player loses upon a negative outcome may be based on any function desired. For example, if the player's credit balance is 100 or less, then a negative outcome takes away 50% of the balance. However, if the player's credit balance is more than 100, the negative outcome takes away only 33% of the player's credit balance. The amount may also be based on, e.g.,: time of day, day of the week, identity of the player, the player's status as a customer of the casino and/or the weather. For example, a player who has visited the casino more than five times in the past year may be considered a good customer of the casino, and may therefore receive the benefit of negative outcomes which take away a relatively smaller proportion of his credit balance. As another example, if it is between 3:00 AM and 7:00 AM, then the casino may want to encourage play, and therefore negative outcomes may be of a smaller magnitude than usual.

Negative outcomes may be depicted with the addition of new symbols to existing gaming devices. For example, "thief" symbols could be added to the reels of a gaming device. Then, a negative outcome would be indicated by the appearance of at least two thief symbols across a pay line. Alternatively, existing symbols of a gaming device could be used to indicate negative outcomes. For example an ordinarily meaningless symbol combination, such as orange-bell-bar, might represent a negative outcome. In some cases, one or more blanks may represent a negative outcome.

TABLES 1 and 2 illustrate how employing negative outcomes can allow a player to win more frequently, without the need to significantly alter the payouts for outcomes, and without the need to alter the payback percentage of the gaming device. The payout structure of a typical slot machine, taken from "Winning At Slot Machines", by Jim Regan, is reproduced in TABLE 1 below:

TABLE 1

| Outcome | 0 | 2 | 2 | 5 | 5 | 5 | 20 | 10 | 10 | 20 | 14 | 14 | 20 | 18 | 18 | 20 | 50 | 100 |
|---|---|---|---|---|---|---|---|---|---|---|---|---|---|---|---|---|---|---|
| Hits | 8570 | 680 | 680 | 200 | 200 | 68 | 20 | 42 | 6 | 42 | 20 | 5 | 50 | 4 | 20 | 20 | 20 | 1 |

The win frequency of a slot machine may be defined as the percentage of outcomes in which the player can expect to achieve a winning outcome. The win frequency may be derived by summing the number of hits for a winning outcome that are contained within a cycle, by the total length of the cycle. In the case of the above payout structure, the win frequency is:

$$(\#\text{Hits for first outcome paying } 2 + \#\text{Hits for second outcome paying } 2 + \ldots + \#Hits\text{ for outcome paying } 100)/(\text{Length of cycle}) = (680 + 680 + \ldots + 1)/10648 \approx 19.5\%$$

The payout structure described by TABLE 1 will be modified to include the addition of a negative outcome. The new payout structure is as follows:

TABLE 2

| Outcome | 0 | −10 | 2 | 2 | 5 | 5 | 5 | 20 | 10 | 10 | 20 | 14 | 14 | 20 | 18 | 18 | 20 | 50 | 100 |
|---|---|---|---|---|---|---|---|---|---|---|---|---|---|---|---|---|---|---|---|
| Hits | 3386 | 864 | 5000 | 680 | 200 | 200 | 68 | 20 | 42 | 6 | 42 | 20 | 5 | 50 | 4 | 20 | 20 | 20 | 1 |

The new payout structure includes a negative outcome that causes a player to lose 10 coins from his credit balance. The new payout structure allows the first outcome paying ‘2’ to occur much more often than it had. The outcome now occurs on 5000 hits of the cycle, whereas previously it had occurred on just 680 hits of the cycle. The total length of the cycle has not changed, remaining at 10648. The win frequency can be shown to have increased to approximately 60.1% (from 19.5%). Nevertheless, the payback percentage of the gaming device has not changed. A payout structure such as the one above can be more exciting to a player, since he now wins more often than he had with the original payout structure of TABLE 1.

Despite the example provided in TABLE 2 above, the negative outcome need not be a fixed amount lost. For example, the negative outcome could cause the balance to be reduced by 50%.

When a negative outcome results in a reduction, and the amount of reduction is based on the balance, then (in the long run) a player’s balance might tend towards an equilibrium balance and not increase without bound. To illustrate, assume a negative outcome reduces a balance by 50%, while all of the winning outcomes increase the balance by a particular amount. When the player has a high credit balance, the negative outcome will have a relatively greater impact, and the player’s expected return from any outcome will be negative. Therefore, the balance will tend to decrease.

However, when the player has a low balance, the impact of the negative outcome will be relatively minor. The effects of the winning outcomes will outweigh the effects of the negative balance. Thus the player will have a positive expected return on every outcome, and his balance will tend to increase.

For some balance, termed an equilibrium balance, the effects of the negative outcome and the winning outcome will cancel each other out, and the player will have an approximately zero expected payback on every spin. Over the long run, the player’s credit balance will tend to fluctuate around the equilibrium balance. Therefore, a casino might provide the player with a relatively large number of pulls, for a relatively small initial price, knowing that the player’s credit balance will tend to remain in the vicinity of the equilibrium balance, and not grow continually. A player may even receive a large number of pulls that are then executed very rapidly by the gaming device. For example, the player may receive 5000 pulls, all of which are executed automatically by the gaming device in the span of two minutes. The gaming device might then pay the player the amount of any remaining credit balance after 5000 pulls.

TABLE 3 below illustrates an exemplary calculation of the equilibrium balance ($B_{eq}$) when a negative outcome reduces a balance (B) by 50%. The payout structure with the negative outcome is reproduced below, in which the negative outcome results in a reduction of 0.5B (i.e. y adding −0.5B).

TABLE 3

| Outcome | 0 | −0.5B | 2 | 2 | 5 | 5 | 5 | 20 | 10 | 10 | 20 | 14 | 14 | 20 | 18 | 18 | 20 | 50 | 100 |
|---|---|---|---|---|---|---|---|---|---|---|---|---|---|---|---|---|---|---|---|
| Hits | 3386 | 864 | 5000 | 680 | 200 | 200 | 68 | 20 | 42 | 6 | 42 | 20 | 5 | 50 | 4 | 20 | 20 | 20 | 1 |

The equilibrium balance $B_{eq}$ occurs when a player does not make a wager to initiate an outcome, and when the expected payout on an outcome is zero. Therefore, the following equation sets the expected payout equal to zero:

$$EV = (\text{prob of } 1^{st} \text{ outcome}) \times (\text{payout of } 1^{st} \text{ outcome}) + (\text{prob of } 2^{nd} \text{ outcome}) \times (\text{payout of } 2^{nd}\ outcome) + \ldots + (\text{prob of last outcome}) \times (\text{payout of last outcome}) = 3386/10648 \times 0 + (\text{prob of negative outcome}) \times -.5B_{eq} + 5000/10648 \times 2 + \ldots + 1/10648 \times 100 = 0$$

Rearranging the equation above, to isolate $B_{eq}$ gives:

$$(\text{prob of negative outcome}) \times .5B_{eq} = 3386/10648 \times 0 + 5000/10648 \times 2 + \ldots + 1/10648 \times 100$$

$$B_{eq} = (1/.5)/(\text{prob of negative outcome}) \times (3386/10648 \times 0 + 5000/10648 \times 2 + \ldots + 1/10648 \times 100)$$

$$B_{eq} = 2/(864/10648) \times (3386/10648 \times 0 + 5000/10648 \times 2 + \ldots + 1/10648 \times 100)$$

$$B_{eq} \approx 43.3$$

In other embodiments, negative outcomes may result in different effects, including but not limited to the following:

1. The amount of a guaranteed bonus is reduced. For example, if a player was guaranteed to receive $50 at the end of an hour of play, the player might now be guaranteed to receive only $40.
2. A lower-value prize is substituted for a higher-value prize that had originally been guaranteed to a player. For example, rather than being guaranteed a one-night stay in a suite of the casino, the player is guaranteed only a one-night stay in a regular room.
3. The player's winnings balance is reduced.
4. The amount of money a player had inserted into a gaming device prior to initiating a handle pull is reduced, possibly to zero.
5. The amount of consideration due to a player is reduced. For example, the player may have inserted $20 to receive a promise of a $50 meal in the future, which is subsequently changed to a $40 meal.
6. The quality of a player's comp is reduced. For example, the player may have a comp for a meal at a gourmet restaurant. However, as the player receives negative outcomes, the player's comp may become a dinner at the steakhouse, then a meal at the coffee shop, then a buffet, then a free item at the snack bar, and then nothing.

In various embodiments, a player may be restricted as to when he can receive the equity in his gaming device. For example, the player might be engaged in 'contract play' in which he may only cash out his credit balance, e.g., after having made a predetermined number of handle pulls, or after having played for a predetermined period of time. In another example, a player may be guaranteed a bonus payout, but only after having completed a required amount of play, such as 500 handle pulls or one hour of play. A player's equity might be a prize (e.g. a free $50 dinner) that he can only retrieve at a particular time (e.g. at dinner time).

The gaming device may determine whether the player is allowed to receive his remaining equity. For example, the gaming device may determine whether the player has completed the number of handle pulls required for a 'contract', or whether the player has completed the required amount of play to receive a guaranteed bonus.

In various embodiments, a player may be restricted in different ways as to when he can receive different portions of the equity. For example, the player may have made only 80 of the 100 pulls required in a contract. However, the player may still be allowed to retrieve a portion of his equity (e.g., 50%). In one embodiment, the act of receiving a portion of equity causes the player to forfeit any remaining amount of equity.

In some embodiments, the gaming device may even provide the player with extra equity if he retrieves his equity early. This decision may be made if it is desirable to free the gaming device for other players at that time.

The following are several examples which illustrate additional embodiments of the present invention. These examples do not constitute a definition of all possible embodiments, and those skilled in the art will understand that the present invention is applicable to many other embodiments. Further, although the following examples are briefly described for clarity, those skilled in the art will understand how to make any changes, if necessary, to the above-described apparatus and methods to accommodate these and other embodiments and applications.

In one embodiment, at any given time, a player may have the option of receiving a full or a partial amount of equity he has established in a gaming device. The casino server also may allow a player to move from one gaming device to another, without the player having to first retrieve his equity from the gaming device. Rather, the casino server can facilitate the transfer of equity from one gaming device to another, e.g. by communicating to the first gaming device that it no longer may provide equity to a player, and by communicating to a second gaming device that it now may provide equity to a player.

In one embodiment, a player need not make a wager prior to initiating a handle pull. The player may simply establish equity in the machine, and then have a portion of such equity deducted upon the occurrence of a negative outcome.

In one embodiment, the magnitude of a negative outcome depends on the number of times the negative outcome has occurred in the past. For example, the first time a negative outcome occurs, it might cause the player to lose 10 credits. The next time it occurs, the player loses 20 credits. The third time the negative outcome occurs, the player loses 40 credits. The magnitude of a negative outcome may:

1. Increase by a fixed amount each time the negative outcome occurs. For example, each time the negative outcome occurs, the player loses five more credits than he had lost the last time the negative outcome occurred.
2. Increase by a fixed percentage. For example, the magnitude of the negative outcome increases by 50% each time it occurs.
3. Decrease by a fixed amount each time the negative outcome occurs. For example, the player may lose 10 credits the first time a negative outcome occurs, lose nine credits the second time, eight credits the third time, and so on.
4. Decrease by a fixed percentage each time the negative outcome occurs. For example, the magnitude of the negative outcome goes decreases by 10% of its previous value each time the negative outcome occurs.
5. Increase by a random amount each time the negative outcome occurs.
6. Decrease by a random amount each time the negative outcome occurs.

In various embodiments, the amount by which equity is reduced upon a negative outcome may vary. For example, the amount may depend on the number of times with which it has occurred in a player session and/or when it has occurred. For example, suppose a first negative outcome occurs on the first outcome, and causes the player to lose 10 credits. If the next negative outcome occurs on the second outcome, then the player might lose 8 credits. However, if the next negative outcome occurs on the third outcome, then the player might lose 6 credits. The amount may both increase and decrease within the same session. For example, the amount may alternate between −10 and −20. In some embodiments, the negative outcome may occasionally be a winning outcome for the player. For example, nine out of ten times, a negative outcome takes away 20 credits from a player. However, one out of ten times, the negative outcome gives the player more credits.

In some embodiments, a player's equity may expire over time. For example, every minute, a player may lose a credit from his credit balance. In another example, starting 30 seconds after the resolution of his last handle pull, the player loses a credit from his balance for every ten seconds in which he does not initiate the next handle pull. This embodiment may be useful where a player has paid a fixed amount of money upfront in order to play for a fixed amount of time, begun with a certain number of credits, and where after the fixed amount of time the player gets to keep any remaining credits. If the player has a high credit balance towards the end of the time period, the player may be inclined to slow down his rate of play so as to avoid negative outcomes. By allowing player equity to expire, especially when the player is not initiating handle pulls, the player is discouraged from avoiding play.

In some embodiments, a player's equity may expire as a function of the number of handle pulls. For example, the player loses 1 credit every five handle pulls. In some embodiments, the player's equity may grow as a function of time, or handle pulls. The payout table of the gaming device may be altered, if desired, in order to counterbalance the effects of expiring or growing equity. For example, if player equity expires, the player may have a relatively more favorable payout table. If equity grows, the player may have a relatively less favorable payout table. In some embodiments, equity grows as a function of time in order to reward the player for his play. Thus, a player who has played for many hours may have a large equity balance.

In one embodiment, a player may carry over an equity balance from one session to another.

In one embodiment, when a gaming device has the potential to generate negative outcomes, such potential may be clearly displayed, e.g. with a lit sign on or near the top of the gaming device.

In one embodiment, negative outcomes do not have an effect until a threshold number of them have occurred. For example, a negative outcome occurs when any "thief" symbol appears on the pay line of a gaming device. When a player first achieves a thief symbol, a symbol of the thief appears in the lower right hand corner of the display screen of the gaming device. When the player next achieves a thief symbol, a second thief symbol appears in the bottom of right hand corner of the display screen of the gaming device. Finally, when the third thief symbol appears, the player loses 30 credits. However, now the thief symbols in the bottom right hand corner of the display screen disappear, and the player needn't worry until he achieves another three symbols.

In one embodiment, the effects of a first negative outcome are conditional upon the occurrence of a second negative outcome. For example, a player may accumulate any number of thief symbols in the lower right hand corner of his gaming device. However the thief symbols have no effect until the player obtains a "super-thief" symbol. When the super-thief symbol occurs, the player loses 10 credits for every thief symbol he had previously accumulated.

In one embodiment, a player may have a separate equity account, or balance, as described herein. The player may add to or subtract from this equity balance. For example, the player may add credits to his equity balance, or cash out credits from his equity balance. The player may have a separate credit balance for placing wagers. The player may also add or subtract from his credit balance as desired.

An exemplary process according to one embodiment is described immediately below. This description is provided solely as an example of one embodiment.

A player initiates play at a gaming device which requires wagers of one dollar. The gaming device is called Billy Goat Gruff, and includes instructions which state, "Buy a block of pulls, start with a balance of ten credits, and win lots more when ever you see a goat symbol across an active pay line. But beware of the troll. When a troll symbol appears on an active pay line you lose half your balance." There is also displayed on the gaming device information regarding the prices for different 'blocks' of handle pulls. The player decides to buy the block of twenty pulls for $10.

The player inserts a ten-dollar bill into the gaming device and presses a button labeled "20 pull block". A portion of the display of the gaming device is labeled "pulls remaining", and that portion now shows the number '20'. The credit balance shows the number '10'. The player makes his first five handle pulls. On each pull, there are many symbols of happy goats. The player wins credits on each of these handle pulls, and his credit balance quickly rises to '30'. But then, on his sixth pull, a troll symbol came up. John's credit balance decreased from '30' to '15'. In the next few handle pulls, the player gradually increases his balance, but then another troll appears during one of the outcomes and once again half of the balance is lost. Just before the twentieth pull, the player has built the balance back up to '32'. The player pulls the handle one last time, achieves a winning outcome, and finishes with a balance of '35'—a profit of $25.

Another exemplary process according to one embodiment is described immediately below. This description is provided solely as an example of one embodiment.

The player is happy after making a profit of $25, but he had been extremely nervous immediately before that last handle pull. He wanted to be able to quit when he was ahead, and not have to make more pulls that could bring up the troll. So the player instead switches to another Billy Goat Gruff gaming device, but this one does not require player to buy 'blocks' of handle pulls. The player was only required to maintain a minimum credit balance of '20'. The gaming device only required one credit wagers. Additionally, any troll that came up would take away '10' credits from the balance. The player began by inserting a $50 bill, establishing the balance at '50'. The player then began to play. Soon, he was up to a balance of '65'. He sensed that a troll was about to come up, so he cashed out right away and kept his $15 profit.

Although the present invention has been described with respect to a preferred embodiment thereof, those skilled in the art will note that various substitutions may be made to those embodiments described herein without departing from the spirit and scope of the present invention.

What is claimed is:

1. An article of manufacture comprising:

a display device;

a processor; and a memory device configured to store a program, which when executed by the processor, causes the processor to operate with the display device to:

(a) display a credit balance having a first amount of credit greater than zero;

(b) after displaying said credit balance, receive, from a player, a request to initiate a play of a primary game, the request including a placement of a wager amount greater than zero; and (c) after receiving said request:

(A) initiate the play of the primary game; and (B) for each initiated play of the primary game:

(i) deduct the wager amount from said displayed credit balance such that, after said deduction of said wager amount and prior to determining any outcome of the play of the primary game, said displayed credit balance has a second, different amount of credit;

(ii) after deducting the wager amount, randomly determine one of a plurality of different primary game outcomes for the play of the primary game, the plurality of different primary game outcomes including at least one negative outcome; and (iii) if the randomly determined outcome of the play of the primary game is said at least one negative outcome, deduct a negative outcome amount greater than zero from said displayed credit balance such that, after said deduction of the negative outcome amount, said displayed credit balance has a third amount of credit, said deduction of the negative outcome amount occurring prior to any other wager amount being placed in association with another request to initiate another play of the primary game.

2. The article of manufacture of claim 1, wherein the negative outcome amount is based, at least in part, on the randomly determined outcome.

3. The article of manufacture of claim 1, wherein the negative outcome amount is based, at least in part, on a percentage of the second credit balance.

4. The article of manufacture of claim 3, wherein the percentage is based on the second amount of credit.

5. The article of manufacture of claim 4, wherein when executed by the processor, the program causes the processor to use a first percentage if the second amount of credit is above a predetermined threshold and use a second, different percentage if the second amount of credit is below the predetermined threshold.

6. The article of manufacture of claim 1, wherein the negative outcome amount is greater than the wager amount.

7. The article of manufacture of claim 6, wherein the negative outcome amount is twice the wager amount.

8. The article of manufacture of claim 6, wherein the negative outcome amount is a predetermined multiple of the wager amount.

9. The article of manufacture of claim 1, wherein the negative outcome amount is based, at least in part, on a random determination.

10. The article of manufacture of claim 1, wherein the negative outcome amount is based, at least in part, on an amount of time which has elapsed.

11. The article of manufacture of claim 1, wherein the negative outcome amount is based, at least in part, on a plurality of randomly determined outcomes.

12. The article of manufacture of claim 1, wherein the negative outcome amount is based, at least in part, on the randomly determined outcome and at least one previous randomly determined outcome.

13. The article of manufacture of claim 12, wherein when executed by the processor, the program causes the processor to evaluate the at least one previous randomly determined outcome to determine if the at least one previous randomly determined outcome was the negative outcome.

14. The article of manufacture of claim 1, wherein when executed by the processor, the program causes the processor to determine a number of times said at least one negative outcome has occurred previously.

15. The article of manufacture of claim 1, wherein said at least one negative outcome amount is based, at least in part, on a total number of outcomes associated with the player.

16. An article of manufacture comprising:

a display device;

a processor; and a memory device configured to store a program, which when executed by the processor, causes the processor to operate with the display device to:

(a) display a credit balance having a first amount of credit greater than zero; and (b) for each initiated play of a primary game:

(i) after displaying said credit balance and in response to receiving a request from a player to initiate the play of the primary game, deduct a wager amount greater than zero from said displayed credit balance such that, after said deduction of said wager amount and prior to determining any outcome of the play of the primary game, said displayed credit balance has a second, different amount of credit;

(ii) after deducting the wager amount, randomly determining one of a plurality of different primary game outcomes for the play of the primary game, the plurality of different primary game outcomes including at least one negative outcome;

(iii) if the randomly determined outcome of the play of the primary game is said at least one negative outcome, deduct a negative outcome amount greater than zero from the displayed credit balance such that, after said deduction of the negative outcome amount, said displayed credit balance has a third amount of credit, said deduction of the negative outcome amount occurring prior to:

(A) any other wager being placed in association with another request to initiate another play of the primary game; and (B) adding any amount of credit to said displayed credit balance in association with the play of the primary game; and (iv) thereafter, if said displayed credit balance has an amount of credit greater than zero, provide the player with at least a portion of said displayed credit balance.

17. A gaming system comprising:

at least one gaming device including at least one input device and at least one display device; and at least one controller configured to operate with said at least one gaming device to:

(a) display a credit balance having a first amount of credit greater than zero; and (b) for each initiated play of a primary game:

(i) after displaying said credit balance and in response to receiving a request from a player to initiate the play of the primary game, deduct a wager amount greater than zero from said credit balance such that, after said deduction of said wager amount and prior to determining any outcome of the play of the primary game, said displayed credit balance has a second, different amount of credit;

(ii) after deducting the wager amount, randomly determine one of a plurality of different primary game outcomes for the play of the primary game, the plurality of different primary game outcomes including at least one negative outcome;

(iii) if the randomly determined outcome for the play of the primary game is said at least one negative outcome, deduct a negative outcome amount greater than zero from said displayed credit balance such that, after said deduction of the negative outcome amount, said displayed credit balance has a third amount of credit, said deduction of the negative outcome amount occurring prior to another wager being placed in association with another request to initiate another play of the primary game; and (iv) thereafter, if said displayed credit balance has an amount of credit greater than zero, enable the player to cash out at least a portion of said displayed credit balance.

18. A gaming system comprising:

at least one gaming device including at least one input device and at least one display device; and at least one controller configured to operate with said at least one gaming device to:

(a) display a credit balance having a first amount of credit greater than zero;

(b) after displaying said credit balance, receive, from a player, a request to initiate a play of a primary game, the request including a placement of a wager amount greater than zero; and (c) after receiving said request:

(A) initiate the play of the primary game; and (B) for each initiated play of the primary game:

(i) deduct the wager amount from said credit balance such that, after said deduction of said wager amount and prior to determining any outcome of the play of the primary game, said displayed credit balance has a second, different amount of credit;

(ii) after deducting the wager amount, randomly generate one of a plurality of, different primary game outcomes for the play of the primary game, the plurality of different primary game outcomes including at least one negative outcome; and (iii) if the randomly generated outcome of the play of the primary game is said at least one negative outcome, deduct a negative outcome amount greater than zero from said credit balance such that, after said deduction of the negative outcome amount, said displayed credit balance has a third amount of credit, said deduction of the negative outcome amount occurring prior to:

(1) any other wager being placed in association with another request to initiate another play of the primary game; and (2) adding any amount of credit to said displayed credit balance in association with the play of the primary game.

19. The gaming system of claim 18 wherein the at least one gaming device comprises a mobile terminal.

20. An article of manufacture comprising:

a display device;

a processor; and a memory device configured to store a program, which when executed by the processor, causes the processor to operate with the display device to:

(a) display a credit balance having a first amount of credit greater than zero;

(b) after displaying said credit balance, receive, from a player, a request to initiate a play of a primary game, the request including a placement of a wager amount greater than zero; and (c) after receiving said request:

(1) initiate the player of the primary game; and (2) for each initiated play of the primary game:

(i) deduct the wager amount from said displayed credit balance such that, after said deduction of said wager amount and prior to determining any outcome of the play of the primary game, said displayed credit balance has a second, different amount of credit;

(ii) after deducting the wager amount, randomly determine one of a plurality of different primary game outcomes for the play of the primary game based on either a first payout table or a second, different payout table, said plurality of different primary game outcomes including a plurality of negative game outcomes, said first payout table including a first negative outcome and said second payout table including a second, different negative outcome;

(iii) if the randomly determined outcome of the play of the primary game is said first negative outcome, deduct a first negative outcome amount greater than zero from said displayed credit balance such that, after said deduction of the first negative outcome amount, said displayed credit balance has a third amount of credit, said deduction of the first negative outcome amount occurring prior to:

(A) any other wager being placed in association with another request to initiate another play of the primary game; and (B) adding any amount of credit to said displayed credit balance in association with the play of the primary game; and (iv) if the randomly determined outcome of the play of the primary game is said second negative outcome, deduct a second, different negative outcome amount greater than zero from the credit balance such that, after said deduction of the second negative outcome amount, said displayed credit balance has a fourth amount of credit different from said third amount of credit, said deduction of the second negative outcome amount occurring prior to:

(A) any other wager being placed in association with another request to initiate another play of the primary game; and (B) adding any amount of credit to said displayed credit balance in association with the play of the primary game.

21. The article of manufacture of claim 20, wherein when executed by the processor, the program causes the processor to switch between the first payout table and the second payout table.

22. The article of manufacture of claim 21, wherein switching between the first payout table and the second payout table comprises receiving permission from the player to switch between the payout tables.

23. The article of manufacture of claim 21, wherein switching between the first payout table and the second payout table comprises automatically switching between the payout tables.

24. An article of manufacture comprising:

a display device;

a processor; and a memory device configured to store a program, which when executed by the processor, causes the processor to operate with the display device to:

(a) display a credit balance having a first amount of credit greater than zero; and (b) for each initiated play of a primary game:

(i) after displaying said credit balance and in response to receiving a request from a player to initiate the play of the primary game, deduct a wager amount greater than zero from said displayed credit balance such that, after said deduction of said wager amount and prior to determining any outcome of the play of the primary game, said displayed credit balance has a second, different amount of credit;

(ii) after receiving said request:

(A) initiate the play of the primary game; and (B) randomly determine one of a plurality of different primary game outcomes for the play of the primary game, the plurality of different primary game outcomes including at least one negative outcome; and (iii) if the randomly determined outcome is said at least one negative outcome:

(A) deduct a negative outcome amount greater than zero from said displayed credit balance such that, after said deduction of the negative outcome amount, said displayed credit balance has a third amount of credit, said deduction of the negative outcome amount occurring prior to any other wager being placed in association with another request to initiate another play of the primary game; and (B) present information to the player relating to the at least one negative outcome through a plurality of negative outcome indicia.

25. The article of manufacture of claim 24, wherein the plurality of negative outcome indicia comprise a plurality of thief symbols.

26. An article of manufacture comprising:

a display device;

a processor; and a memory device configured to store a program, which when executed by the processor, causes the processor to operate with the display device to:

(a) display a credit balance having a first amount of credit greater than zero;

(b) receive, from a player, a request to initiate a play of a primary game, the request including a placement of a wager amount greater than zero; and (c) for each initiated play of the primary game:

(i) after receiving said request, deduct the wager amount from said displayed credit balance such that, after said deduction of said wager amount and prior to determining any outcome of the play of the primary game, said displayed credit balance has a second, different amount of credit;

(ii) randomly generate an outcome for the play of the primary game;

(iii) determine whether the randomly generated outcome for the play of the primary game includes a negative outcome indicia;

(iv) repeat (ii) to (iii) at least once; and (v) after repeating (ii) to (iii) at least once, if a predetermined quantity of negative outcome indicia have been randomly generated, deduct a negative outcome amount greater than zero from said displayed credit balance such that, after said deduction of the negative outcome amount, said displayed credit balance has a third amount of credit, said deduction of the negative outcome amount occurring prior to any other wager being placed in association with another request to initiate another play of the primary game.

* * * * *

UNITED STATES PATENT AND TRADEMARK OFFICE

CERTIFICATE OF CORRECTION

PATENT NO. : 8,070,577 B2
APPLICATION NO. : 10/420981
DATED : December 6, 2011
INVENTOR(S) : Jay S. Walker et al.

It is certified that error appears in the above-identified patent and that said Letters Patent is hereby corrected as shown below:

IN THE CLAIMS:

In Claim 3, column 17, line 32, delete “second”.

In Claim 15, column 18, lines 5-6, delete “at least one”.

In Claim 16, column 18, lines 25-26, replace “determining” with --determine--.

In Claim 18, column 19, line 36, after “of” delete “,”.

In Claim 20, column 20, line 2, replace “player” with --play--.

Signed and Sealed this
Twenty-first Day of February, 2012

David J. Kappos
*Director of the United States Patent and Trademark Office*